United States Patent [19]

Simon

[11] Patent Number: 5,381,758
[45] Date of Patent: Jan. 17, 1995

[54] PARROT TOWER

[76] Inventor: David F. Simon, P.O. Box 92136, Warren, Mich. 48090

[21] Appl. No.: 160,715

[22] Filed: Nov. 30, 1993

Related U.S. Application Data

[63] Continuation-in-part of Ser. No. 637,693, Jan. 7, 1991, abandoned.

[51] Int. Cl.⁶ ............................................. A01K 31/12
[52] U.S. Cl. ......................................... 119/26; 119/24; 108/156
[58] Field of Search .................. 119/22, 23, 24, 25, 119/26, 17, 706, 57.8, 57.9; 211/206, 205, 195, 13; 108/24, 26, 25, 156

[56] References Cited

U.S. PATENT DOCUMENTS

| | | | |
|---|---|---|---|
| D. 153,272 | 4/1949 | Forner | 119/26 |
| 2,240,631 | 5/1941 | Stewart . | |
| 2,796,043 | 6/1957 | Albert . | |
| 3,119,372 | 1/1964 | Gantz . | |
| 3,479,990 | 11/1969 | Crow | 119/706 |
| 4,441,457 | 3/1984 | Sanford | 119/57.9 |
| 4,627,384 | 12/1986 | Courteau | 119/16 |
| 5,010,848 | 4/1991 | Ranklin | 119/26 |
| 5,018,480 | 5/1991 | Goldman et al. . | |
| 5,195,460 | 3/1993 | Loken | 119/57.8 |

FOREIGN PATENT DOCUMENTS 1162628  2/1964  Germany .
2842898  4/1980  Germany .

Primary Examiner—John G. Weiss
Attorney, Agent, or Firm—Weintraub DuRoss & Brady

[57] ABSTRACT

A parrot tower having a plurality of removable orthopedic perches attached to a center column, the column being mounted atop a sterilizable tray. The entire unit is formed of plastic, such that it may be easily transported and assembled/disassembled. The perches are formed such that no perch extends beyond the edge of the tray thereof, thus preventing the spilling of seeds or droppings. A plurality of reinforcing ribs allows a center column to achieve a height of three feet without more than a few inches of the center column being deployed therewith in the tray.

7 Claims, 1 Drawing Sheet

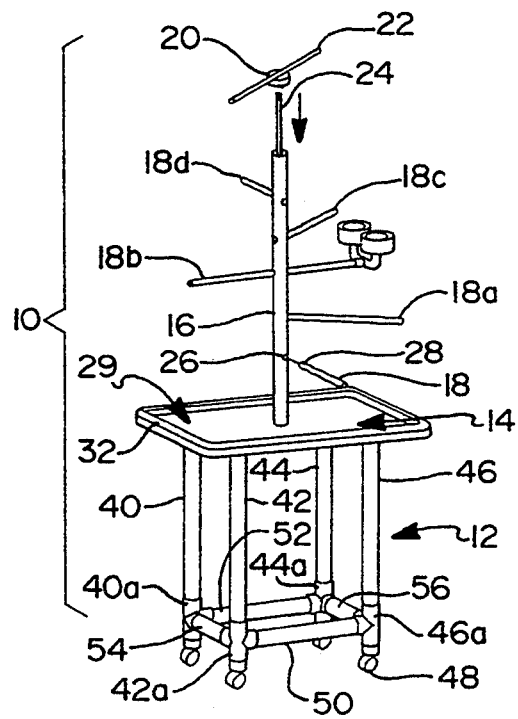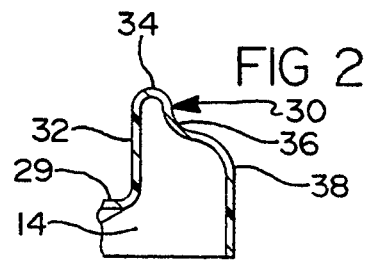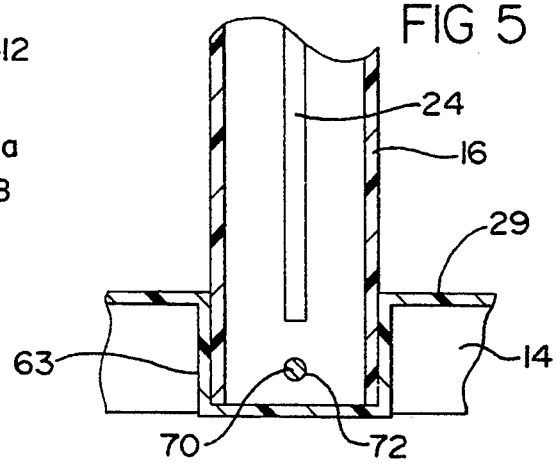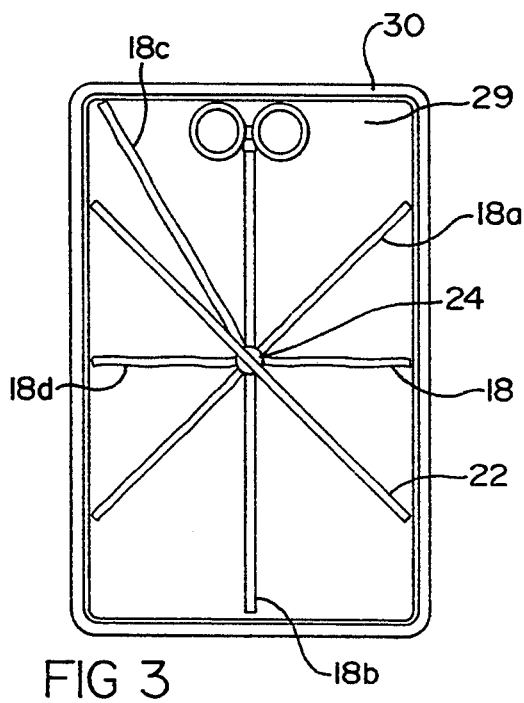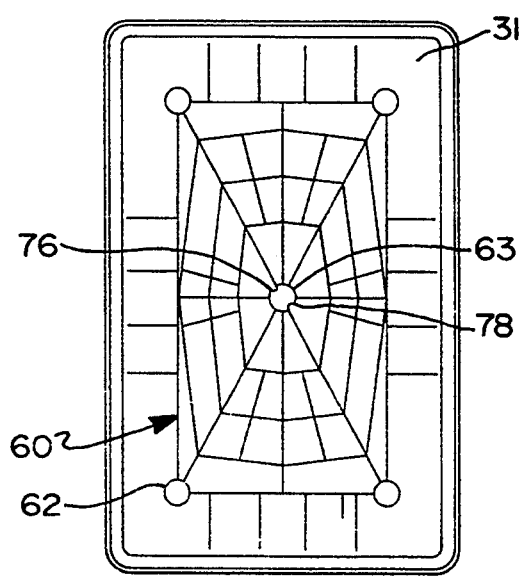

PARROT TOWER

CROSS-REFERENCES TO RELATED APPLICATION

This application is a continuation-in-part of pending U.S. patent application Ser. No. 07/637,693, filed Jan. 7, 1991, now abandoned said application being incorporated herein by reference.

BACKGROUND OF THE INVENTION

1. Field of the Invention

The present invention concerns indoor living environments for avians. More particularly, the present invention concerns a tower structure suitable for parrots of any size, and particularly larger avians, such as macaws. Even more particularly, the present invention relates to sanitary living environments for large avians which are both transportable, easily disassembled and easily cleaned and sterilized.

2. Description of Related Art

Bird cages and other indoor environments to bring avians into the human home or office are known. Particularly, we are all familiar with the common bird cage which contains a finch, canary or other small avian having a couple perches, a seed cup and a water dish. While serviceable for small birds, such cages for larger birds, such as cockatoos and macaws, become quite large. Further, these cages are normally made of steel or other metallic products. These surfaces can, under certain circumstances, induce illness in the birds living therearound. Additionally, the cleaning of perches from the inside of the cage is difficult, due to their location inside of the cage. Overall, this leads to an unsanitary and unacceptable condition for birds, often promoting illness or a lack of activity which produces poor health.

The present invention provides an environment which is both healthful to the bird by its elimination of disease, and by the encouragement of physical activity on the part of the bird. Further, the present invention offers a light-weight and easily cleanable environment. It is to the overcoming of these problems that the present invention is directed.

SUMMARY OF THE INVENTION

The present invention is an avian tower formed of washable and sterilizable plastic. The parrot tower of the present invention comprises:

(a) a tray;
(b) a center column releasably mounted upon the tray;
(c) a plurality of perches releasably connected to the center column; and
(d) means for sustaining the perches to the center column.

The parrot tower of the present invention may further comprise a movable stand which is connected to the bottom of the tray thereof. Additionally, the tower may comprise, as the means for sustaining the perches, a reinforcement rod deployed through the center of the center column and bisecting each of the perches attached thereto.

The tray of the parrot tower of the present invention further comprises a plurality of ribs formed to the bottom thereof surrounding and supporting a cup formed centrally thereof. The ribs give necessary strength so that the center column, which is mounted therein, may be supported. Additionally, it is of note that the perches of the present parrot tower are deployed such that no perch extends beyond the perimeter of the upper surface of the tray. This is done so as to keep all bird droppings and seeds positioned to fall upon the tray, and not onto the floor or surrounding area.

For a more complete understanding of the present invention, reference is made to the following detailed description and accompanying drawings. In the drawings, reference characters refer to like parts throughout the several views, and where:

BRIEF DESCRIPTION OF THE DRAWINGS

FIG. 1 is a perspective view of the avian tower of the present invention;

FIG. 2 is a cross-sectional view of the edge of the tray of the present invention;

FIG. 3 is a top view of the avian tower of the present invention;

FIG. 4 is a bottom view of the tray of the present invention; and

FIG. 5 is a cross-sectional view of the center column mounted within the tray of the avian tower of the present invention.

DETAILED DESCRIPTION OF THE PREFERRED EMBODIMENTS

Referring now to FIG. 1, there is shown the present invention, to wit, an avian tower 10. The parrot tower 10 comprises a stand 12, a tray 14, a center column 16, a plurality of perches 18, 18a, 18b, 18c, 18d, a cap 20 having a perch 22 mounted thereon, and a support rod 24.

The stand 12, in the preferred embodiment, comprises four legs 40, 42, 44, 46. Each leg 40, 42, 44, 46 is connected, ideally releasably attached, to a joint member 40a, 42a, 44a, 46a. To each joint member is connected at the bottom thereof a roller 48. The rollers 48 allow the tower 10 to be transported along a floor to different locations, as desired or as circumstances dictate. To give additional strength to the stand 12, reinforcing members 50, 52, 54, 56 are connected to and between the joint members 40a, 42a, 44a, 46a. In the preferred embodiment, all elements comprising the stand 12 are formed of plastic, such that the stand 12 is sturdy, yet light-weight. Alternately, elements of the stand may be formed of wood or metal, as is suitable.

Referring now to FIGS. 1–4, the tray 14 can be seen to be mounted atop the stand 12. The tray 14 comprises an upper surface 29, enclosed by an edge 30, and a bottom surface 31, having a plurality of ribs 60 supporting a mounting hole 63 and four leg contacts 62. The leg contacts 62 receive therein the legs 40, 42, 44, 46, such that the tray 14 securely rests atop and is supported by the stand 12.

As can be seen in FIG. 4, the ribs 60 form a web-like structure around the mounting hole 63. The mounting hole 63 receives therein the center column 16, as will be described further herein below. The ribs 60 provide the support necessary for the center column 16 and the perches 18 attached thereto to support a bird perching thereupon. The ribs 60 additionally give support to the mounting to the leg contact 62.

Referring now to FIGS. 1–2, the edge 30 of the tray 14 comprises an inside portion 32, a rounded top 34, a sloped upper portion 36 and a tapered lower portion 38. The inside portion 32 is substantially vertical, thus being substantially normal to the upper surface 29 of the tray 14. Unitarily formed to the inner portion 32 is the rounded top 34. The top 34 has a polished surface, such as would be difficult for a bird to stand upon. This discourages the bird from wandering off the tray 14 or spilling seeds or droppings outside of the edge 30. The upper portion 36 is unitarily formed to the top 34 and slopes away from the interior of the tray 14. The lower portion 38 is unitarily formed to the upper portion 36. The lower portion 38 being sloped downwardly, such that the lower portion 38 tapers to its meeting with the bottom 31 of the tray 14.

The tray 14 is preferably formed of plastic, in particular, polyvinylchloride. The tray 14 is formed by injection molding, using techniques well-known in the art. The use of plastic affords a sturdy, yet light-weight tray. Further, the tray 14 being made of plastic affords a surface which can easily be cleaned and sterilized, adding to the health of all those in the vicinity of the tower 10, particularly the avian.

Referring now to FIGS. 4 and 5, the center column 16 is mounted onto the tray 14. The center column 16 fits into a cup 63 formed in the center of the tray 14. The tray 14 is reinforced around this cup 63, such that the column 16 is erect and balanced. The reinforcement given the cup 63 by the ribs 60 allows the center column 16 to be extended two to three feet above the tray 14 with only a few inches of the column 16 being inserted into the cup 63. This extended lever arm is achieved only by the reinforcing ribs 60 used in conjunction with the hole cup 63.

The column 16 is further secured by deployment of a bar 70 through a pair of colinear apertures 72 in the column 16. The bar 70 is inserted through the first aperture 76 of the tray 14, then through the column 14 into the apertures 72 formed therein. Finally, the bar passes through a second aperture 78 in the tray 14. Thus, the bar 70 effects an anchorage of the column 16 to the tray 14.

It is of note that the tray 14 has no metal fastenings or other objects exposed along or near the inner surface thereof. This is an important advantage of the present invention. Metal tends to corrode, which presents a very unsanitary condition for birds. Additionally, it can produce sharp edges which may cut or otherwise injure the bird. By keeping all such metal objects away from the vicinity of the bird, the present invention achieves a more sanitary and healthy environment for the avian.

The center column 14 has releasably attached thereto a plurality of perches 18, 18a, 18b, 18c, 18d. The center column 16 has a plurality of holes formed therein, one representative hole being indicated at 26. As seen in FIG. 1, the perch 18 can be inserted into the hole 26. A corresponding hole (not seen) is formed colinearly on the opposite side of the column 16, such that the perch 18 extends therethrough both sides of the column 16. The perch 18b also clearly achieves this, as way of the second example.

A reinforcing rod 24 is deployed through the middle of the center column 16, such that it prevents the perches 18, 18a, 18b, 18c, 18d from coming free from the column 14. Each perch, such as the perch 18, has an upper aperture 28 and a lower colinear aperture (not shown) formed therein. The apertures 28 are placed such that the apertures 28 are deployed within the middle of the center column 16. The rod 24 is then fed through the column 14 and through the colinear apertures 28 of each perch. This prevents the perches 18, 18a, 18b, 18c, 18d from being withdrawn from the column 16 by any intentional actions, whether human or avian. The rod 24 is prevented from falling through the column 16 by a detent washer (not shown) deployed on the rod 24. Additionally, a spacer washer (not shown) can be deployed in conjunction with the detent washer. A cap 20, having a perch 22 deployed thereatop, may be placed over the upper opening of the center column 16. This prevents the bird from gaining access to the metal reinforcing rod contained therein, and preventing exposure to this potentially unhealthy item from contact with the bird.

In relation to FIG. 3, it can be seen that the perches 18, 18a, 18b, 18c, 18d are deployed such that no perch extends beyond the edge 30 of the tray 14. This is done intentionally to limit the of the bird actions and movements to that above the tray. Thus, floors or the other areas surrounding the parrot tower will not receive bird seeds or parrot droppings normally. Although the bird is not prevented from jumping off the parrot tower or otherwise flying away due to the lack of any restraining device, it is noted that parrots will stay in an area where they are safe and allowed to move around freely. The present invention provides this, and the perches, beginning with perch 18 and maneuvering through perch 18d, form a type of step ladder that the bird may move up and down at will. This will amuse and occupy the bird, as well as providing a source of cardiovascular activity. This will encourage bird activity and general overall health, which Applicant believes is lacking heretofore in the art.

In use, the tower 10 may be quickly and easily assembled. The supporting members may be easily joined to the joint members 40a, 42a, 44a, 46a, and the legs 40, 42, 44, 46 attached thereatop, to quickly form the stand. The tray 14 may then be quickly mounted atop the legs 40, 42, 44, 46 into the leg contacts 62. The center column 16 may then be deployed within the reinforced cup 63, and secured with the bar 70. The perches 18, 18a, 18b, 18c, 18d may then be deployed within the holes 26 on the center column 16, particularly so that the colinear apertures 28 of the perches are coaxial with the column 16. The restraining rod 24 is then slipped through the middle of the center column 16 and through each colinear pair of apertures 28 for each perch. By use of a detent washer or other means, the restraining rod 24 is prevented from slipping through the center column 16 and allowing any perch 18, 18a, 18b, 18c, 18d to move freely. Thus, the perches 18, 18a, 18b, 18c, 18d are secured and remain in place. The cap 20 may then be deployed atop the center column 16, thus placing all metallic objects out of sight.

The perches may further be formed with apertures along the bottom portion of their surface (apertures not shown). These apertures will allow the deployment of toys to the perches, so that they may hang down and offer the bird something to play with. In particular, an orthopedic bird perch, formed in a circular orientation, would offer a ring which the bird could jump onto or swing off of. The ring may then depend from a suitable insert placed into the aperture, such as a screw or plastic nail. As can be seen in FIG. 1, the seed cups 90 may also be deployed upon the perches for use by the bird.

As noted hereinabove, the specification of the parent application has been incorporated by reference. Applicant notes that the perches 18, 18a, 18b, 18c, 18d and 22 are, in the preferred embodiment, orthopedic bird perches comprising a member formed of plastic having formed thereon the outer surface a wood-like texture.

The wood-like texture comprises a pattern of cuts formed into the plastic member, such that a wood grain is simulated. Additionally, Applicant notes that the perches of the present invention have a non-cylindrical formation, that is, that the diameter is varied throughout the member. This achieves the distribution of stress over the various portions of the avian's feet. Thus, orthopedic difficulties are alleviated.

Further, it is noted that these same features can and, in the preferred embodiment hereof, are formed upon the center column 16 of the present invention. Thus, a combination of an orthopedic bird perch having a simulated wood grain is combined with a center column having a wood-like texture formed thereon. These members may be joined releasably, consistent with the description hereabove. In a less preferred embodiment, the perch could be permanently attached to the center column 16.

Having thus described the present invention, what is claimed is:

1. An avian tower comprising:
   (a) a plastic tray formed by injection molding, the tray having:
      (1) a substantially planar member having an upper surface and a lower surface, the planar member being defined by a perimeter;
      (2) an edge formed around the perimeter of the planar member;
      (3) a cup centrally formed in the planar member;
      (4) a plurality of ribs formed to the lower surface of the planar member to reinforce the cup, at least a portion of the ribs contacting the cup;
   (b) a center column releasably mounted on the tray, the column being partially deployed into the cup formed in the tray;
   (c) at least one perch releasably attached to the center column; and
   (d) means for securing the at least one perch to the center column.

2. The avian tower of claim 1, wherein each of the at least one perch is deployed in a plane parallel to the planar member of the tray, each perch having a length such that, when attached to the center column, the perch does not extend beyond the perimeter of the tray.

3. The avian tower of claim 1, further comprising: stand releasably mounted to the lower surface of the tray.

4. The avian tower of claim 1, further comprising: a reinforcing bar, the bar being deployed through a pair of colinear apertures formed in the cup and through a pair of colinear apertures formed in the center column, the bar fixing the location of the center column.

5. An avian tower providing a construction allowing ease of assembly or disassembly for easy movement and cleaning, the tower comprising:
   (a) a stand having a plurality of legs connected thereto, the legs being detachable from the stand;
   (b) a tray having a substantially planar surface defined by a perimeter, the tray having an edge deployed along the perimeter, the edge having:
      (1) an inner portion being substantially vertical;
      (2) a rounded top initially formed to the inner portion;
      (3) an upper portion formed unitarily to the top and sloping away from the inner portion; and
      (4) a lower portion sloping downwardly and tapering away from the internal portion;
   (c) a mounting cup formed centrally within the planar surface of the tray;
   (d) a plurality of reinforcing ribs deployed along the bottom of the tray, the ribs serving to strengthen the cup;
   (e) a center column deployed in the cup, the center column being cylindrical and having a plurality of colinear aperture pairs formed therein;
   (f) a plurality of perches releasably attached to the center column, each perch being deployed in one pair of colinear apertures, the colinear apertures being deployed along a vertical axis within the center column;
   (g) a reinforcing rod deployed through the colinear apertures of the perches, the rod being deployed within the center columns;
   (h) a cap mounted atop the center column; and
   (i) a bar deployed through the cup and the center column;
   wherein the perches are deployed in an arrangement to facilitate climbing by the bird; and
   wherein further the perches are formed to a length such that no perch extends beyond the perimeter of the tray.

6. A tray for use in an avian tower, the tray being formed of injection molded plastic and comprising:
   (a) a substantially planar member having a perimeter therearound, the planar member having a hole formed therein;
   (b) an edge unitarily formed to the planar member, proximate the perimeter;
   (c) a cup having at least one side wall and a bottom, the at least one side wall and bottom cooperating to define an interior, the at least one side wall having an upper edge defining a top opening, the opening being in communication with the interior, the cup being unitarily formed to the planar member such that the hole of the planar member and the opening of the cup are in fluid communication;
   (d) at least one leg contact unitarily formed to the planar member, each leg contact being capable of receiving a leg therein to elevate the tray; and
   (e) a plurality of interconnecting ribs unitarily formed to the planar member, the ribs contacting and reinforcing the cup and each leg contact.

7. The tray of claim 6, wherein the cup has colinear apertures formed therein.

* * * * *

UNITED STATES PATENT AND TRADEMARK OFFICE
CERTIFICATE OF CORRECTION

PATENT NO. : 5,381,758
DATED : January 17, 1995
INVENTOR(S) : David F. Simon

It is certified that error appears in the above-indentified patent and that said Letters Patent is hereby corrected as shown below:

Column 2, line 29: after "avian" insert —or parrot—.

Column 3, line 30: delete "hole".

Column 4, line 15: delete "of the bird".

Column 4, line 16: after "ments" insert —of the bird—.

Column 4, line 52: after "perches" insert —18, 18a, 18b, 18c, 18d—.

Signed and Sealed this

Twenty-third Day of May, 1995

*Attest:*

BRUCE LEHMAN

*Attesting Officer*     Commissioner of Patents and Trademarks